L. BLACK.

Spectacles.

No. 4,065.

Reissued July 12, 1870.

Witnesses:

Jno. H. Brooks

Frank Bloxley

Inventor:

L. Black per Munn & Co

Attorneys.

United States Patent Office.

LOUIS BLACK, OF DETROIT, MICHIGAN.

*Letters Patent No. 96,387, November 2, 1869; reissue No. 4,065, dated July 12, 1870.*

IMPROVEMENT IN SPECTACLES.

The Schedule referred to in these Letters Patent and making part of the same.

*To all whom it may concern:*

Be it known that I, LOUIS BLACK, of Detroit, in the county of Wayne and State of Michigan, have invented a new and useful Improvement in Spectacles; and I do hereby declare that the following is a full, clear, and exact description thereof, which will enable others skilled in the art to make and use the same, reference being had to the accompanying drawing forming part of this specification.

This invention relates to new and useful improvements in spectacles, where it is desired to change the glasses for reading and other purposes; and The invention consists in the construction of certain parts, as hereinafter more fully described.

In the accompanying drawing—

Figure 3 is a sectional front view of spectacles, with the nose-piece attached to the bow by a forked connection.

Figure 1:
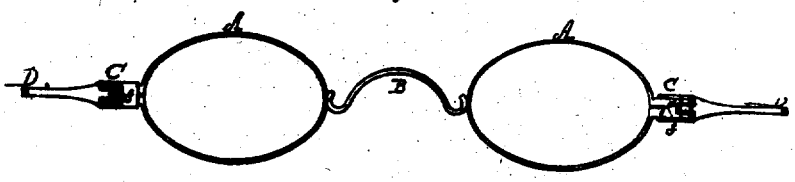
Figure 1 represents a front view of spectacles, constructed according to my invention.
Figure 2:
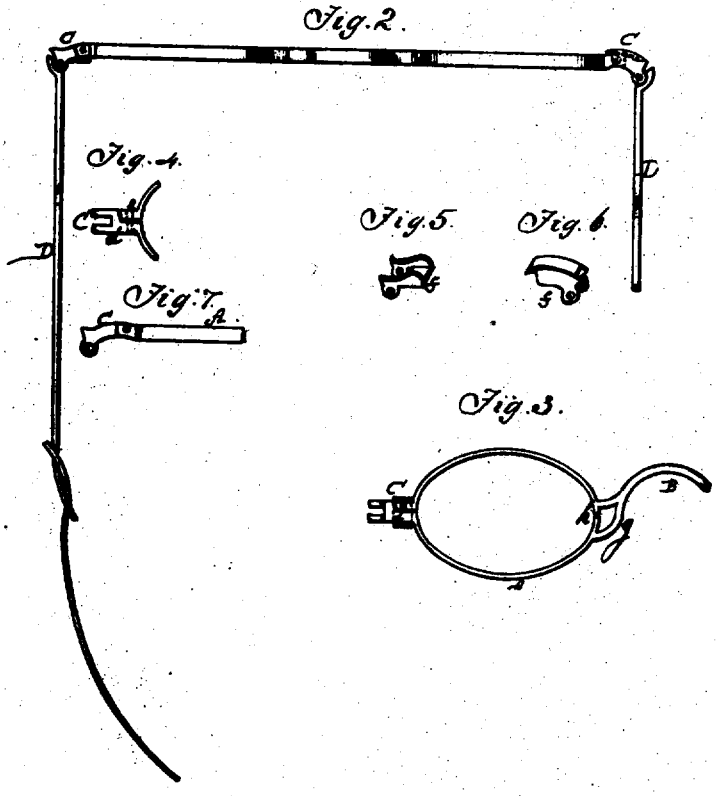
Figure 2 is a top view of the same.

The other figures in the drawing represent details in the construction, which will be hereafter referred to.

Similar letters of reference indicate corresponding parts.

A represents the bows;

B, the nose-piece; and

C C, the shanks, to which the temples D are attached, by joints, in the usual manner.

My object is to construct spectacles and eye-glasses in such a manner that the glasses may be changed at will.

The glasses and frames, or bows, being made of one size, can be changed quickly and securely, without the use of a screw-driver or any other tool. For this purpose I construct the shanks C C in two parts.

These parts are marked *d* and *e*.

*d* is the large part, bearing the hinge by which the "temples" are connected.

This part is notched or rebated to receive the end of the part *e*, the arrangement being plainly seen in the views, figs. 3 and 4.

To prevent the parts from slipping or getting out of place, I provide a dowel-pin, which is fixed to one part, and enters a hole in the other part, as indicated in dotted lines in the drawing.

Fig. 1 represents the shanks, secured together by hinged box-clasps *f*, seen in Figures 5 and 6, the reverse sides of the clasp being shown in the two figures.

These clasps are hinged to the large part *d* of the shanks, by the hinge-rivets of the "temples" D, and may be placed either on the outside or inside of the shank. When they are closed down over the shank, as represented in the drawing, the parts of the shanks are firmly held in the desired position.

Figure 7 is a detail of the shank, without any fastening.

In fig. 3 the nose-piece is attached to the bow A by a forked connection, *g*, the bow being reversed with the fork, as seen at *h*. This arrangement allows of slight variations in the size of the bows, to suit the varying sizes.

The bows need not be reversed, as seen in the drawing, unless a variation in the size is necessary.

I do not confine myself exclusively to hinging the clasp *f* to the shank, as represented. It may be connected with the temple, so as to hold the parts of the shank together, without any permanent attachment to the shank.

The advantage of my hinged clasp over a "socket and spring," is that, in the latter device, one of the parts is apt to drop while the two are being detached. This cannot take place in my clasp.

Again, the tension of a small spring is easily impaired and varied by many causes. This creates a loose and rickety fit of the parts. This difficulty is also obviated entirely by my improvement, since its action is positive, uniform, and not liable to be influenced by extraneous causes.

Having thus described my invention,

I claim as new and desire to secure by Letters Patent—

1. The bow A, open at both ends, but held at the inner by branches on the nose-piece B, as shown in fig. 3 of drawing.

2. The hinged clasp *f*, constructed as shown in figs. 5 and 6 of drawing, combined with a shank formed in two parts, as and for the purpose specified.

LOUIS BLACK.

Witnesses:

PETER GUENTHER,

ARTHUR CLIFTON.